April 8, 1958     D. A. FREEMAN     2,829,809
GARMENT COLLAR SHAPING MACHINE
Filed July 8, 1955     11 Sheets-Sheet 1
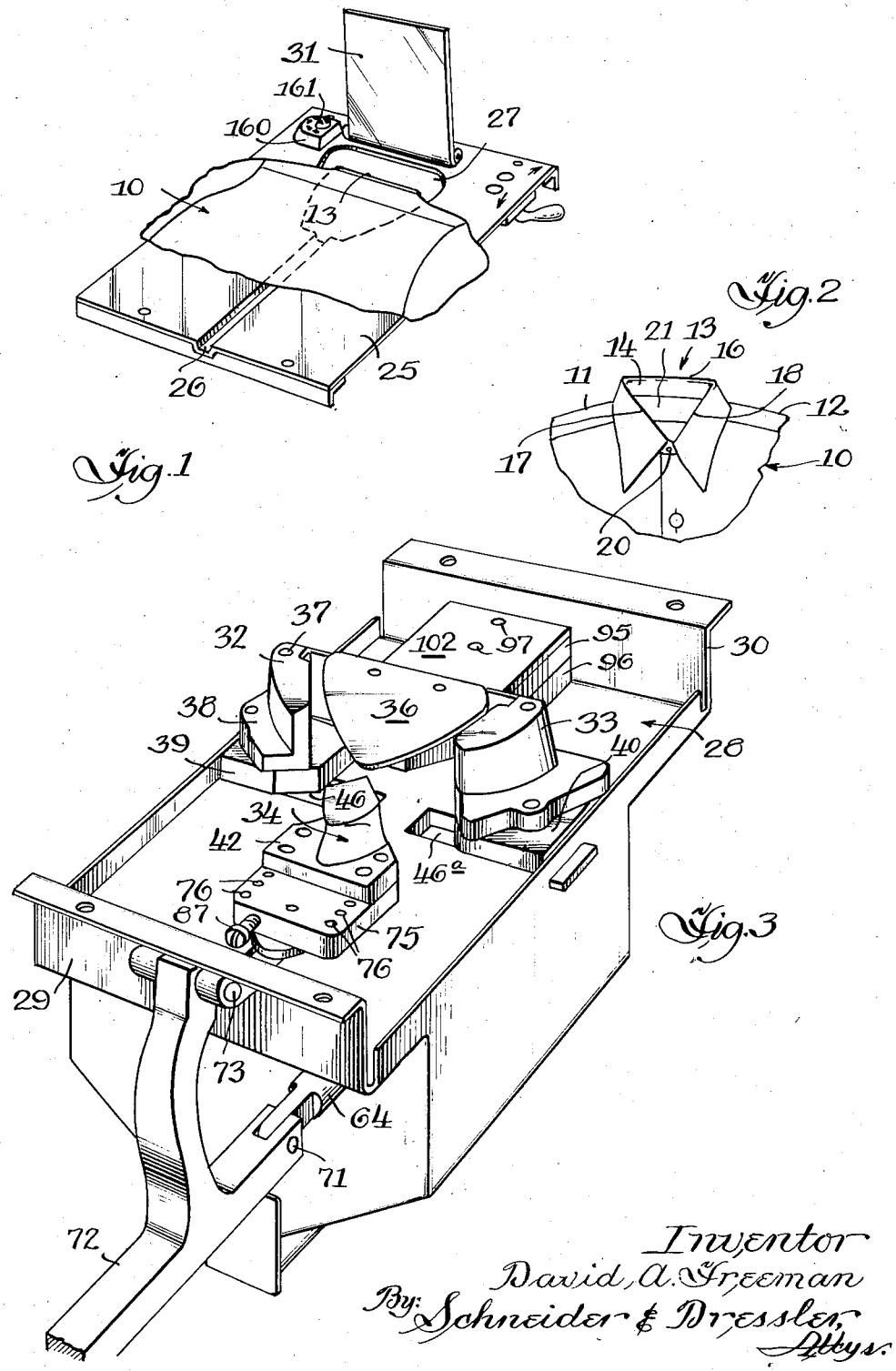

April 8, 1958  D. A. FREEMAN  2,829,809
GARMENT COLLAR SHAPING MACHINE
Filed July 8, 1955  11 Sheets-Sheet 2

Inventor,
David A. Freeman
By: Schneider & Dressler,
Attys.

April 8, 1958     D. A. FREEMAN     2,829,809
GARMENT COLLAR SHAPING MACHINE
Filed July 8, 1955     11 Sheets-Sheet 3

Inventor
David A. Freeman,
By Schneider & Dressler,
Attys.

April 8, 1958 D. A. FREEMAN 2,829,809
GARMENT COLLAR SHAPING MACHINE
Filed July 8, 1955 11 Sheets-Sheet 4
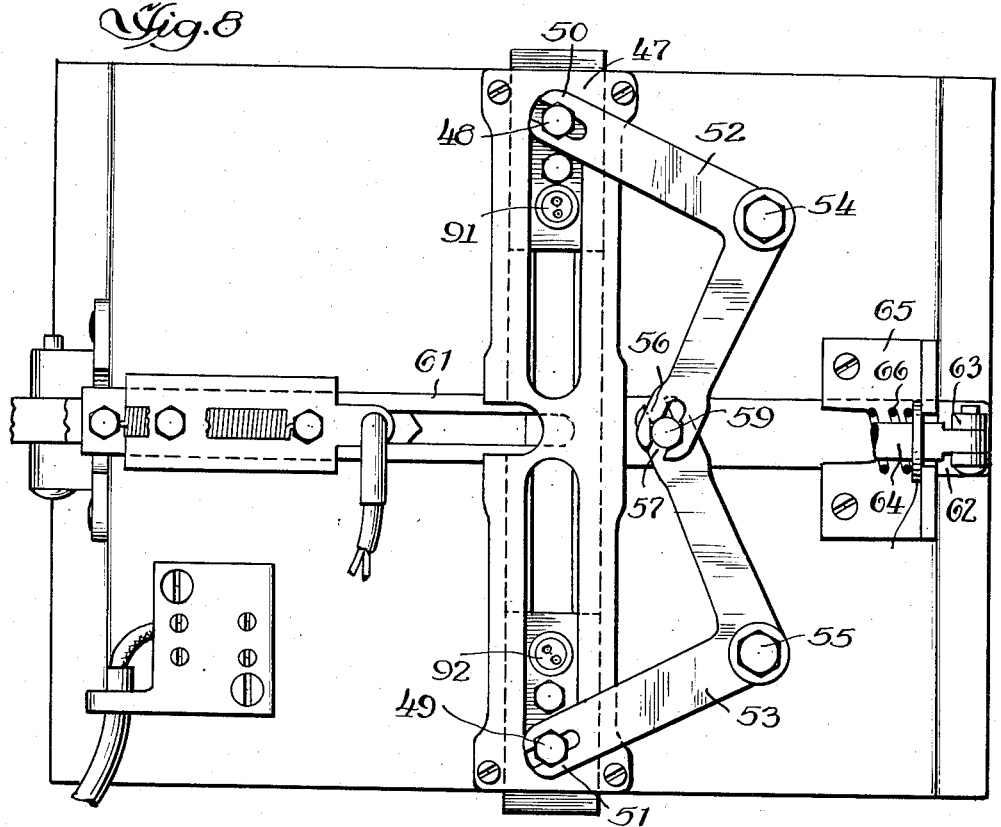
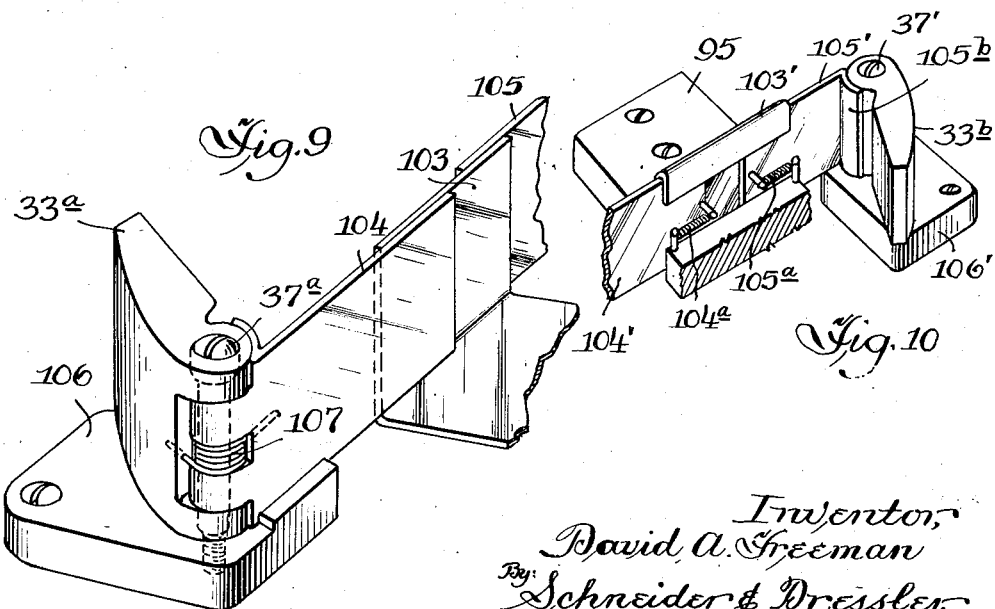
Inventor,
David A. Freeman
By: Schneider & Dressler
Attys.

April 8, 1958 D. A. FREEMAN 2,829,809
GARMENT COLLAR SHAPING MACHINE
Filed July 8, 1955 11 Sheets-Sheet 5
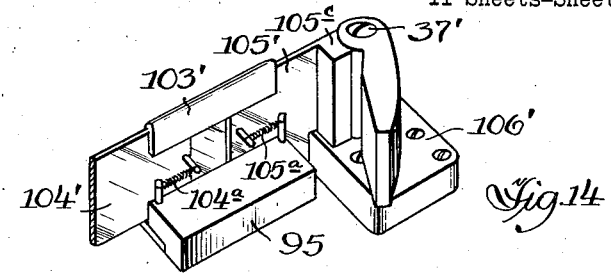
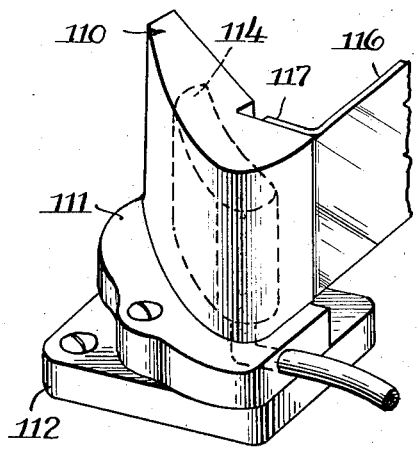
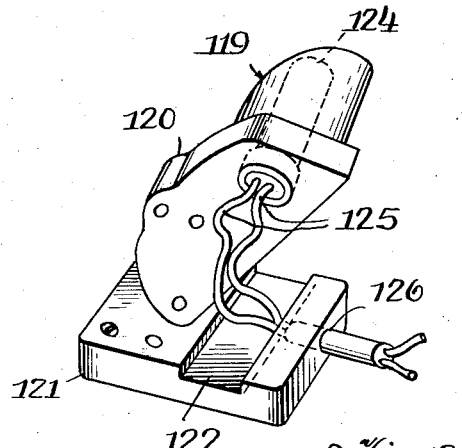
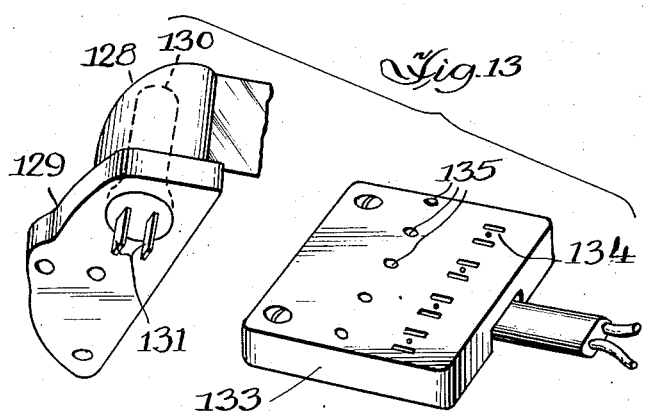
Inventor,
David A. Freeman
By Schneider & Dressler
Attys.

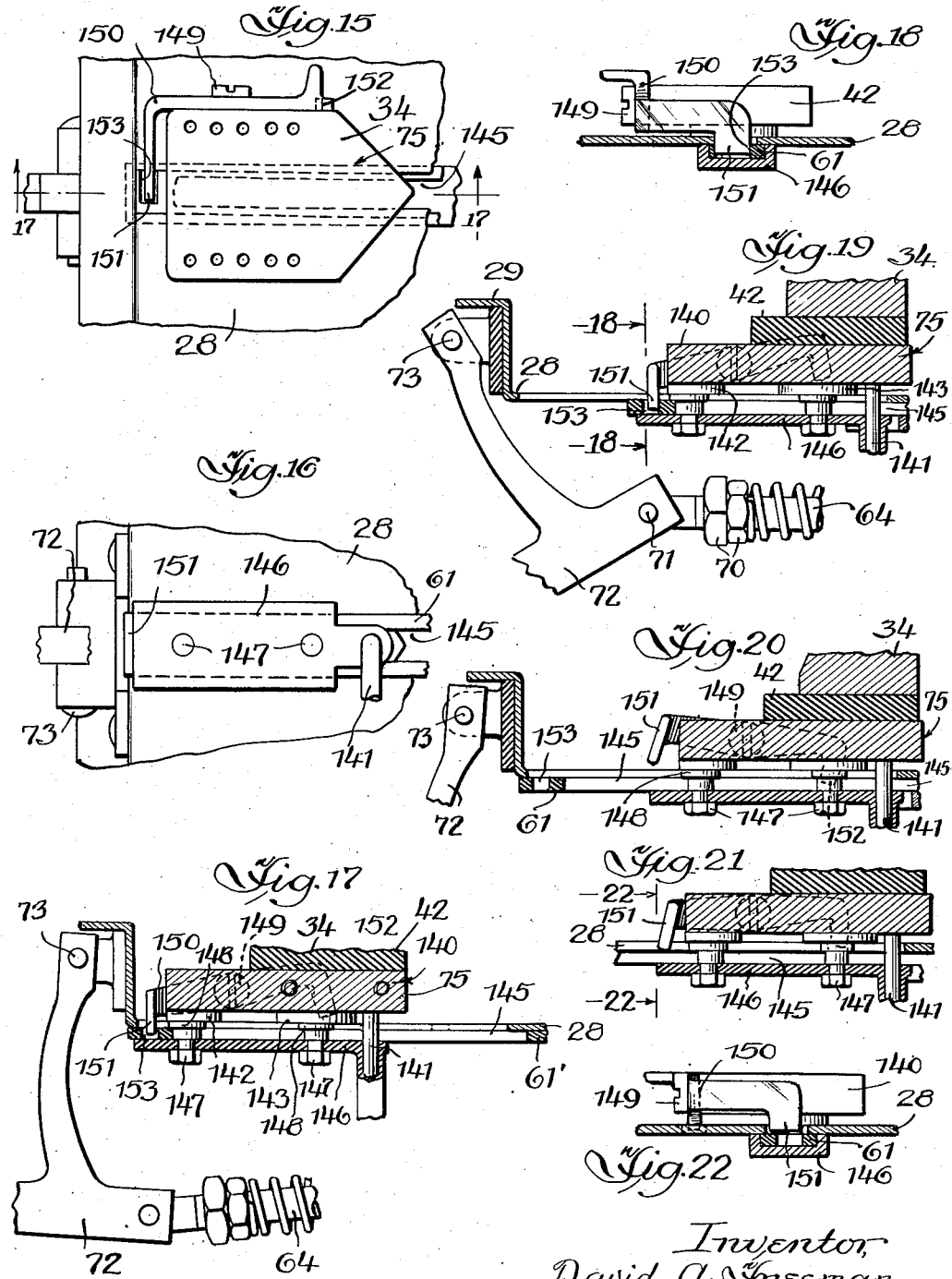

April 8, 1958        D. A. FREEMAN        2,829,809

GARMENT COLLAR SHAPING MACHINE

Filed July 8, 1955        11 Sheets-Sheet 7

Inventor,
David A. Freeman,
By: Schneider & Dressler,
Attys.

April 8, 1958 D. A. FREEMAN 2,829,809
GARMENT COLLAR SHAPING MACHINE
Filed July 8, 1955 11 Sheets-Sheet 9

Inventor
David A. Freeman
By Schneider & Dressler
Attys

April 8, 1958          D. A. FREEMAN          2,829,809
GARMENT COLLAR SHAPING MACHINE
Filed July 8, 1955          11 Sheets-Sheet 10
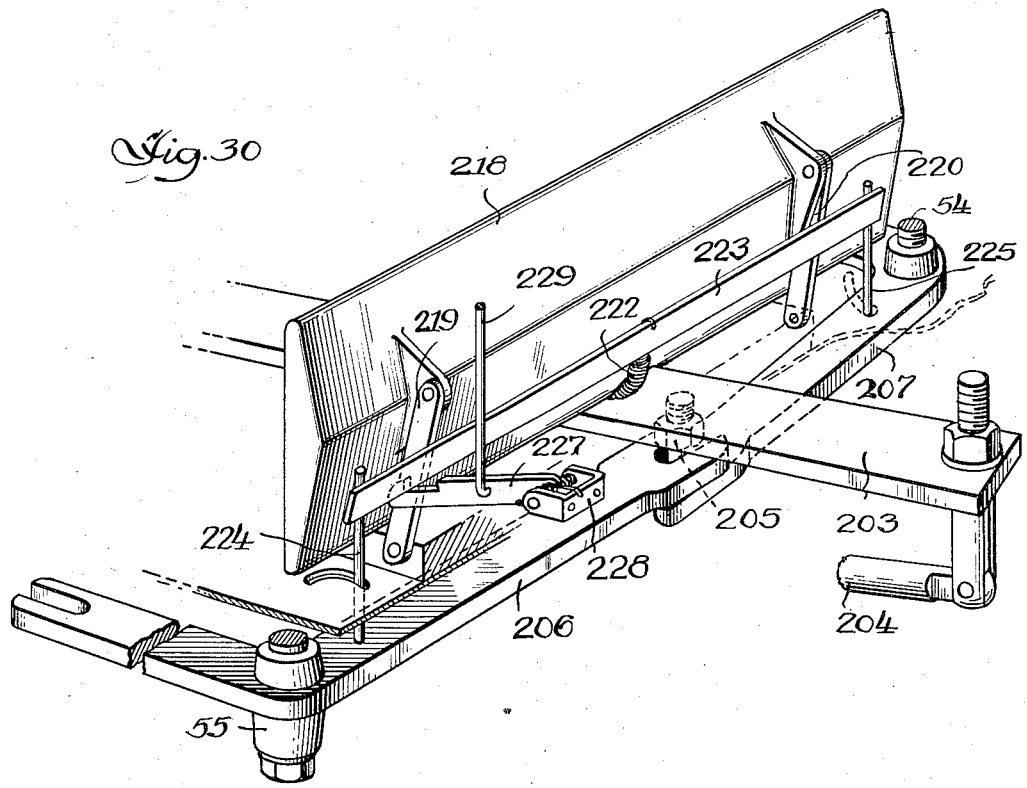
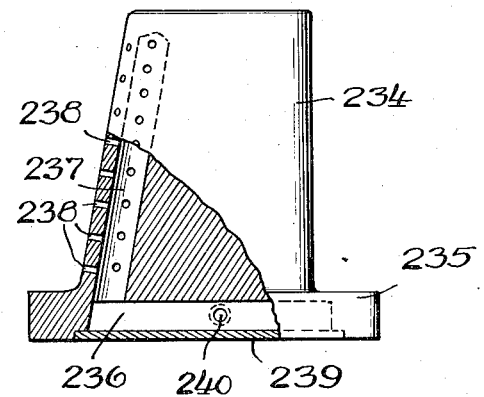
Inventor
David A. Freeman
By: Schneider & Dressler,
Attys.

April 8, 1958 D. A. FREEMAN 2,829,809
GARMENT COLLAR SHAPING MACHINE
Filed July 8, 1955 11 Sheets-Sheet 11
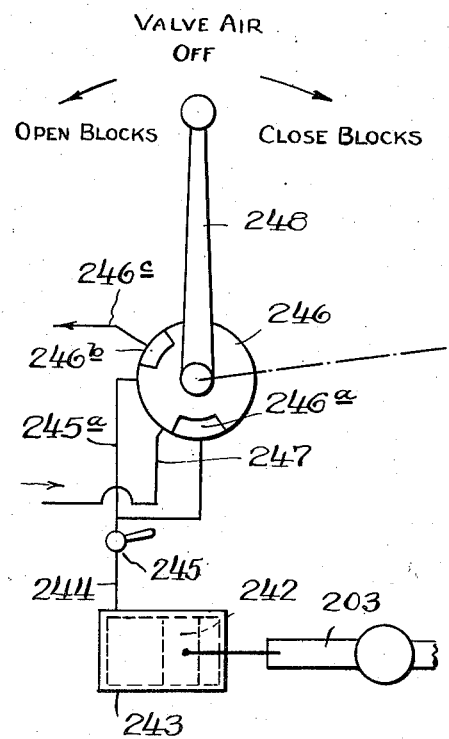
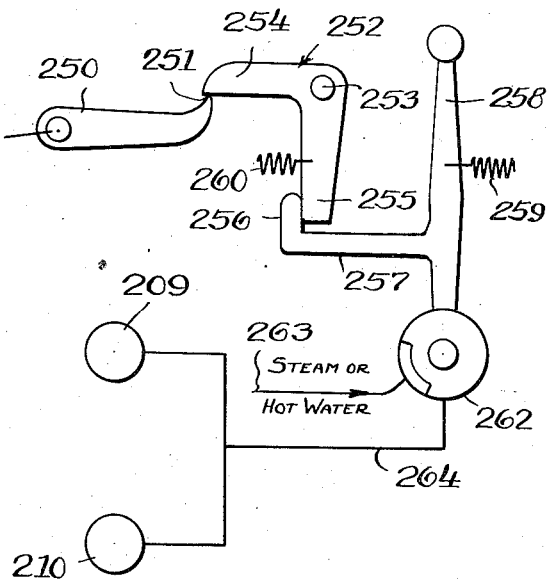
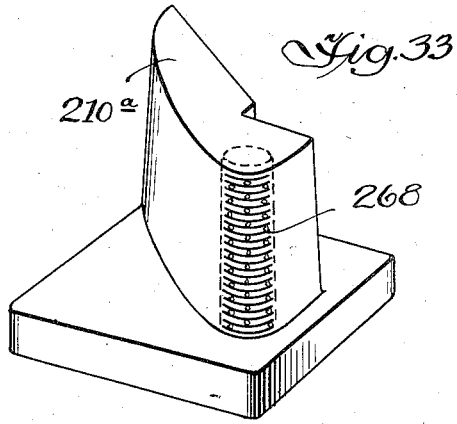
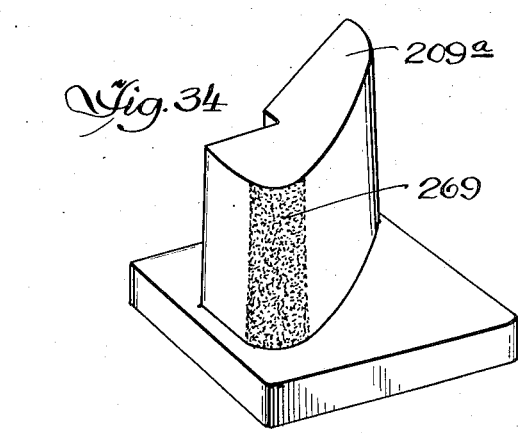
Inventor,
David A. Freeman
By: Schneider & Dressler
Attys.

United States Patent Office 2,829,809
Patented Apr. 8, 1958

2,829,809

GARMENT COLLAR SHAPING MACHINE

David A. Freeman, Chicago, Ill.

Application July 8, 1955, Serial No. 520,684

46 Claims. (Cl. 223—52.1)

This invention relates to a garment collar shaping machine and is particularly adapted to accommodate the wide variety of shapes, styles and sizes of various garments for men, women and children. Such garments may include blouses for women, shirts, jackets, pajamas and the like for men, women and children. For convenience and by way of example the invention will be considered with reference to men's shirts.

A substantial and growing number of men's shirts are of the so-called sport variety wherein the conventional neckband is omitted. In this shirt, the collar is directly attached to the body of the shirt at a seam generally known in the trade as the size line of the shirt. The neckband present in dress shirts is omitted. The wide variety of designs, styles and shapes, as well as sizes, has made it difficult to shape the collar preparatory to packing after the manufacture of the shirt and to shape the collar after laundering and ironing.

In addition to differences in construction of collars, there are different styles of folding collars. In some instances, it is desirable to have the collar folded in such manner that a predetermined constant length of the back of the collar is exposed. In other instances, it is desirable to expose the label and frame the collar around the label so that a pleasing symmetrical arrangement is secured. In addition to the above, non-sport shirts and dress shirts of conventional style must be accommodated.

With the equipment for shaping collars presently available, it has been impossible for any one machine to accommodate the large number of sizes and/or collar shapes. Every year, the introduction of new collar shapes by manufacturers has aggravated the problem. A garment manufacturer or a laundry or dry cleaning establishment which must be ready to handle various styles, shapes and sizes for adults as well as children has heretofore had to have and use different machines, each machine handling a certain type and class of work.

In accordance with this invention there are provided machines having sufficient flexibility and adaptability so that the one machine is readily adapted to handle a wide variety of garment collar styles and sizes. In order that the invention may be understood, reference will now be made to the drawings wherein exemplary embodiments are illustrated, it being understood that variations may be made without departing from the scope of the invention except as defined by the appended claims. Referring therefore to the drawings:

Figure 1 shows a perspective view of the top of a machine embodying the present invention, the view showing a portion of a shirt being worked upon.

Fig. 2 is a detail of a man's shirt illustrating one pressing pattern for the collar.

Fig. 3 is a perspective view of a collar shaping machine embodying the present invention, the figure illustrating the machine with the top plate removed.

Fig. 8 is a bottom view similar to Fig. 6 but showing the mechanism corresponding to an expanded collar shaping block assembly.

Fig. 9 is a perspective detail of a collar shaping block and press plate.

Fig. 10 is a perspective detail of a collar shaping block and modified press plate.

Fig. 11 is a perspective view of a modified form of collar shaping block and press plate.

Fig. 12 is a perspective detail of a further modified form of collar shaping block.

Fig. 13 is a perspective view of a modified form of collar shaping block disassembled from the base block.

Fig. 14 shows an additional modified form of collar shaping block and press plate.

Fig. 15 is a top view of a detail of the collar shaping machine illustrating the driving means for the front shaping block.

Fig. 16 is a bottom view of the detail illustrated in Fig. 15.

Fig. 17 is a section along line 17—17 of the detail illustrated in Fig. 15.

Fig. 18 is a detail along line 18—18 of Fig. 19.

Fig. 19 is a sectional detail similar to Fig. 17 but showing the parts in a different position.

Figs. 20 and 21 are sectional details of the parts illustrated in Fig. 19 but showing the parts in a still further different position.

Fig. 22 is a detail on line 22—22 of Fig. 21.

Fig. 30 is a perspective view of the ironing block and associated mechanism for operating upon the back of the collar.

Fig. 31 is a diagrammatic showing of the control system for providing a momentary blast of water or steam to the two side shaping blocks.

Fig. 32 is an elevation with certain parts broken away illustrating a side shaping block having means to discharge some steam or hot water against the surface being pressed.

Fig. 33 is a perspective view of a serrated side pressing block.

Fig. 34 is a perspective view of a different side pressing block having a roughened surface.

Figure 4:
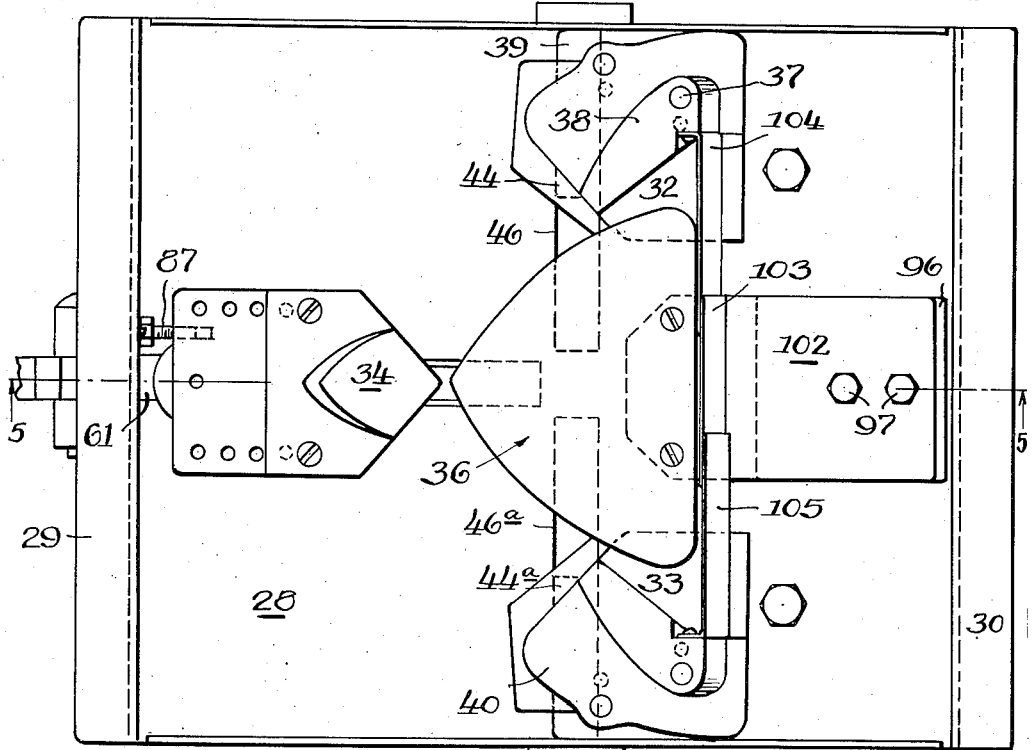
Fig. 4 is a top plan view of the mechanism illustrated in Fig. 3.

Before describing the invention, a brief description of the problem with reference to a man's shirt will be given. Referring to Fig. 2, there is shown a man's shirt, generally indicated by 10, having shoulder or yoke portions 11 and 12 and having a collar generally indicated by 13. Collar 13 is attached to the body of the shirt at size line 14 and in a desired shaped condition of the collar has straight rear portion 16 and side portions 17 and 18 meeting at neck front 20. Shirt 10 has body portion 21 just below rear neck portion 16 and is designated herein for convenience as the rear median portion.

In the proper shaping of a shirt collar, a large number of variables apart from the mere size of the shirt collar present themselves. Thus for example, the break of the collar is an important consideration and involves the creation of a triangular shape formed by the rear and sides of the collar outline. A triangle with a sharp break will have sharp corners formed at the ends of rear collar portion 16 where the sides of the collar outline join. The illustration shows a triangle with a slight break, this being indicated by the curved corners. These curved corners may be rounded even more to provide a triangle with a round break or may be curved still more so that a so-called heart shaped break is provided.

Apart from the nature of the collar break, there is the question of the shape of the collar with regard to various sizes. Considering the general shape of the collar break as being triangular, it is possible to maintain the same triangular shape and have a series of congruent triangles for collars of increasing size. It is possible to maintain a constant distance between the back of the neck portion 16 and neck front 20. If the altitude of the triangular break is maintained constant, then with increase in size, it is clear that the base of the triangle formed by neck portion 16 will become greater. It is also possible to maintain the base of the triangle constant and increase the altitude with increasing collar size, thus moving neck front portion 20 downwardly.

In addition to the above possibilities, the degree of angle of stand-up of the collar must be controlled. Thus if rear neck portion 16 stands up perpendicularly to rear median shirt portion 21, then this may be considered to be a zero degree angle. In practice, however, the rear part of the neck portion of the collar is inclined rearwardly from the vertical and may range from zero degrees or some slight angle as 10° to as much as 90°. The angle is measured by looking sideways and seeing what angle rear portion 16 of the collar makes with the plane perpendicular to the plane upon which the shirt is lying.

In addition, the handling of the collar tips and the "roll" of the collar from the neckline near the front of the collar may be varied to obtain different effects.

It will thus be clear that a shaping machine must be capable of accommodating a large number of variables to produce satisfactory work upon the wide variety of shirts being used.

Referring now to the drawings, one machine embodying the present invention will be described. In Fig. 1, cover 25, preferably of metal, has longitudinally disposed channel 26 extending from front to rear of the machine. Cover 25 is adapted to accommodate shirt 10 so that the shirt may rest upon the cover with the shirt buttons lying in channel 26. Cover 25 has generally triangular cut-out 27 for accommodating the neck portion of the shirt. Cover 25 is bolted to base 28 having upwardly extending front and rear flanges 29 and 30. A rectangular pattern plate 31 is hinged to cover 25 so that when swung down over a shirt, the shirt may be properly folded.

Slidably supported on base 28 are lateral shaping blocks 32 and 33 and front shaping block 34. Shaping blocks 32 and 33 are supported in such manner as to be movable to and from each other while front block 34 is supported in such manner as to be movable along a line generally normal to the line of movement of blocks 32 and 33. Canopy 36 is provided for accommodating the rear median body portion of the shirt. Canopy 36 has a triangular shape and lies above the top surfaces of blocks 32, 33 and 34.

Referring to block 32, this block is secured by pin 37 to base block 38, which base block is in turn secured by one or more bolts to movable actuating block 39. Block 33 is similarly secured to movable actuating block 40. Blocks 32 and 33 have suitable external shapes to obtain the desired collar shaping action to be explained in detail later.

Block 34 is similarly secured to base block 42 and movable actuating block 75. Block 34 will ordinarily have a different shape than blocks 32 and 33 for the reason that block 34 will operate on the front of the collar and determine the front or bottom apex of the triangle as seen in Fig. 2, for example. Blocks 32 and 33, on the other hand, cooperate with parts of sides 17 and 18 of the collar so that the effective surfaces of these blocks may be differently shaped than block 34.

Movable blocks 39 and 40 are each provided with guide block portions 44 and 44a respectively operating in slots 46 and 46a of base plate 28. Guide blocks 44 and 44a are retained in slots 46 and 46a by slotted retainer plate 47 (Fig. 8) bolted to the bottom of base 28. The slots and guide blocks are shown for straight line travel of the guide blocks. The slots and guide blocks may be curved so that the travel path is arcuate and bowing away from block 34. Bolted into the bottom of guide blocks 44 and 44a are bolts 48 and 49 having heads spaced from the guide blocks. Bolts 48 and 49 function as pins and respectively cooperate with slotted ends 50 and 51 of bell crank arms 52 and 53. Bell crank arms 52 and 53 are pivoted at 54 and 55 to base 28. Bell crank arms 52 and 53 have slotted ends 56 and 57 respectively, these ends being laterally offset so that they may overlap (Fig. 5).

Slotted ends 56 and 57 of the bell crank arms cooperate with actuating pin 59 rigidly secured to slider 61 operating below base plate 28. Slider 61 has end portion 62 rigidly attached to connecting strip 63, which in turn is pivoted to push rod 64. Push rod 64 extends through apertured part 65 and has compression spring 66 extending around the rod between washer 67 on the inside of apertured part 65 and adjusting nuts 70 at the end of rod 64. Rod 64 is pivotally secured at 71 to rocker arm 72, which rocker arm is adapted to be moved either by manual or other means. Rocker arm 72 is pivotally secured at 73 to the front part of base 28. Upon movement of the rocker arm in a counterclockwise direction, as seen in Fig. 5, rod 64 will be moved toward the rear of the machine against the compression of spring 66 and thus cause slider 61 to move rearwardly. The rearward movement of slider 61 will move pin 59 and thus actuate the two bell crank arms for causing blocks 39 and 40 to move inwardly toward each other. Slider 61 is supported in position by retainer plate 47 and by plate 65 bolted to the bottom of base 28 (Fig. 8).

Collar front shaping block 34 is carried on block 42 which itself is supported on actuating block 75. Actuating block 75 has a number of pairs of threaded apertures 76 into which bolts from block 42 may extend. Block 42 may be disposed in any desired position determined by the location of the selected pair of recesses 76 to unite the block and collar shaping form. Actuating block 75 is rigidly attached to or is formed integrally with guide block 78 carrying pins 79 and 80 extending downwardly through elongated clearance opening 81 in slide 61. Pins 79 and 80 have shoulders 82 and 83 for elevating the actuating block above base 28 and for insuring smooth travel along the slide. Pin 80 has attached thereto at one end coil spring 85, the other end 86 of which is anchored to part 86a on the slider 61 at the front thereof. Actuating block 75 carries stop bolt 87 adjustably secured therein so that the retracted position of block 75 may be set to any desired point.

Figure 5:
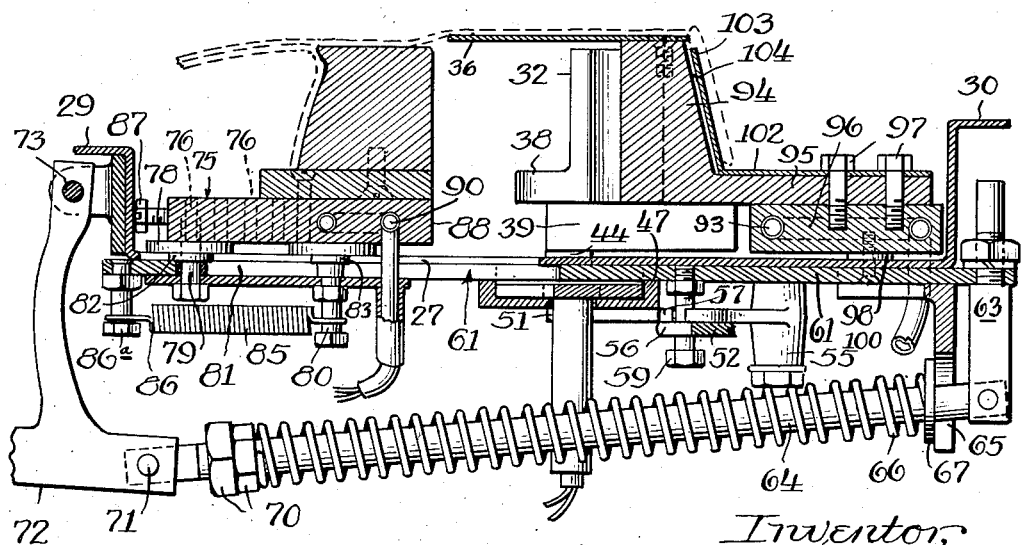
Fig. 5 is a section along line 5—5 of Fig. 4, part of a shirt being shown in dotted outline.
Figure 6:
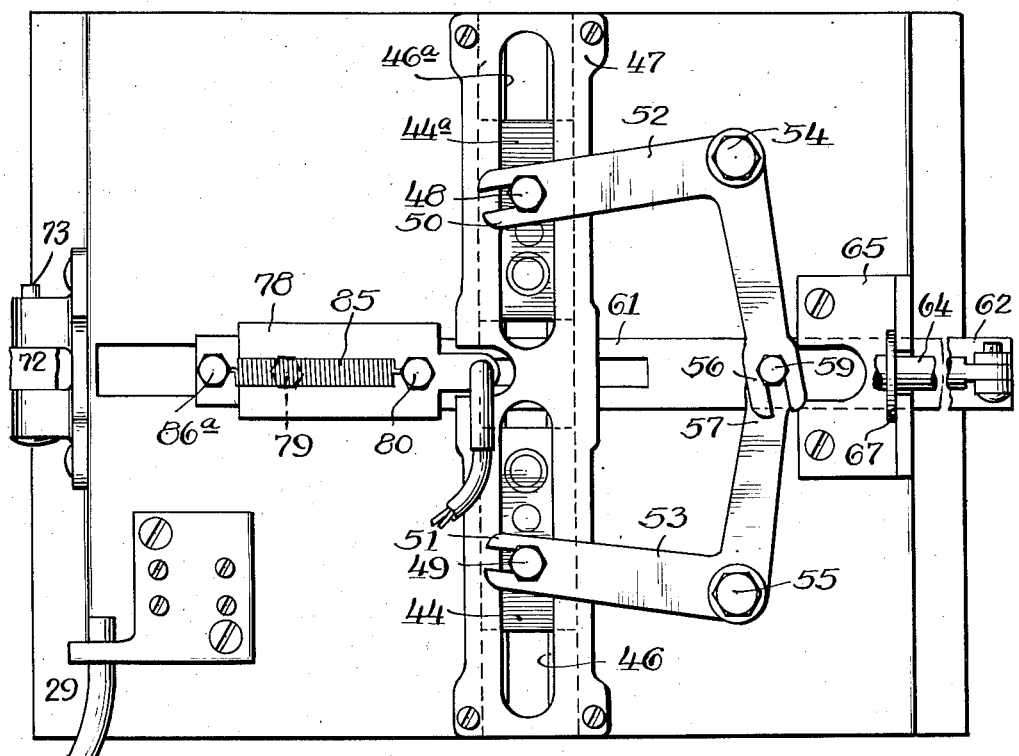
Fig. 6 is a bottom plan view of the mechanism for operating the collar shaping blocks, this view corresponding to a contracted collar shaping block assembly.
Figure 7:
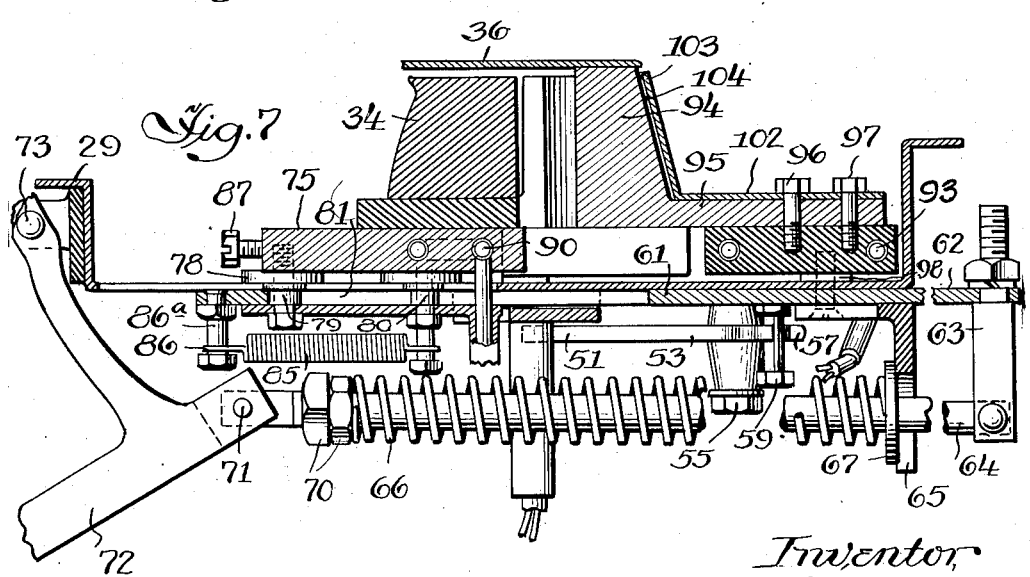
Fig. 7 is a section of the collar shaping machine, the view being generally similar to Fig. 5 but showing the blocks in contracted position ready to receive a shirt.

In a normal position of the machine, coil spring 66 sets the slider in the position as illustrated in Fig. 5 so that shaping blocks 32 and 33 will be in their extreme outer position while block 75 will be in its extreme position as determined by stop bolt 87. Upon movement of rocker arm 72 and consequent movement of rod 64, slider 61 will operate the two bell cranks as previously stated and at the same time can move block 75 inwardly toward the line of movement of blocks 32 and 33.

Actuating block 75 has portion 88 immediately below block 42 and shaping block 34, said portion 88 containing electric heating element 90 embedded therein. Electric heating element 90 may have suitable thermostat means to insure that the temperature of the actuating block and shaping block will be maintained at a suitable value for pressing. Similarly, base blocks 39 and 40 accommodate heaters 91 and 92 for heating forming blocks 32 and 33 (Figs. 5-8).

Referring now to shirt support canopy 36 (Fig. 5), this is supported on block 94 by bolts or other suitable attaching means. Block 94 has portion 95 resting upon heating block 96 carrying an electric heater 93 therein. Block 95 and heating block 96 are rigidly joined as by bolts 97. Block 96 has bosses 98 for spacing heating block 96 from base plate 28, bolts 100 being provided for maintaining the heating block and block 94 rigidly attached to base 28. Bolts 97 carried by part 95 of block 94 also support pressing plate 102 (Fig. 5) having upstanding active pressing plate portion 103. Pressing plate portion 103 has on opposite sides thereof slidable pressing plates 104 and 105. Pressing plates 104 and 105 are carried by blocks 32 and 33 and move therewith. Heating block 96 serves to heat canopy 36 and plate 102.

In the form of the machine illustrated in Figs. 1 to 8 inclusive, blocks 32 and 33 do not pivot around pins 37 but remain fixed on blocks 39 and 40. Pressing plates 104 and 105 are bolted or attached to the blocks 32 and 33 and thus these bladelike pressing plates move lengthwise.

In a modification illustrated in Fig. 9, block 33a, for example, is pivotally secured to base 106 by means of pivot pin 37a threaded into base 106. Base 106 is rigidly secured to guide block 40 of the machine. It is necessary to provide relative angular movement between shaping block 33a and pressing plate 104 and to this end block 33a and pressing plate 104 are constructed as illustrated in Fig. 9 to provide slotted interfitting portions similar to a door hinge. Spring 107 is disposed around pin 37a and has ends resting against block 33a and pressing plate 104, the spring bias tending to open up these parts.

It is necessary to maintain pressing plate 104 in a fixed position with respect to base 106. To this end, base 106 is slotted or grooved with the bottom edge of pressing plate 104 sliding in the same. Thus the spring force tending to provide angular movement of block 33a and plate 104 is directed against block 33a.

The same modified construction may be used in connection with block 32. As blocks 32 and 33 approach each other, pressing plates 104 and 105 will slide toward each other, these two plates in the form of the invention illustrated in Fig. 9 being on opposite sides of stationary plate 103. In this modification, the pivoted block can adapt itself to a collar and will press a maximum part of the collar. In all modifications, heat by conduction will maintain the various pressing plates at desirable ironing temperature.

Referring now to Fig. 10, a further modified construction is illustrated wherein stationary block 95 carries stationary pressing plate 103' having the edge bent over as illustrated. Sliding in grooves in block 95 are movable plates 104' and 105', these plates being maintained in position by virtue of the bent over portion of stationary plate 103'. Coil springs 104a and 105a stretch between pins carried by block 95 and pins carried by the respective ends of plates 104' and 105' biasing these plates in a direction away from each other.

Block 33b in this form is secured to base block 106' by bolt 37', the bolt being drawn tightly to lock shaping block 33b in predetermined adjusted position. Pressing plate 105' has curved portion 105b shaped to conform to the generally circularly shaped end portion of block 33b. Thus spring 105a will maintain pressing plate 105' tightly disposed against the rounded end of shaping block 33b. Corresponding block 32 may be similarly constructed for the modification illustrated in Fig. 10.

Referring to Fig. 11, a modified side shaping block is illustrated wherein a still different spring construction is provided. In Fig. 11, block 110 is rigidly attached to base block 111 by bolts or other suitable means. Base block 111 is attached to guide block 112 by a number of bolts. Shaping block 110 has an electric heating element shown in dotted lines and indicated by 114 within the body thereof, the wire leads for the electric heating element coming down into base block 111. Shaping block 110 carries rigidly attached thereto spring pressing plate 116. Pressing plate 116 has attaching portion 117 bolted or otherwise rigidly attached to the body of block 110.

Instead of electric heating means for block 110, gas, hot water or steam heating means may be used. The same is true of all the electric heating means illustrated and/or described. Where a shaping block, as 110 in Fig. 11, is provided with heating means, the base block may be independently heated or not, as desired.

Referring to Fig. 12, a further modified form of shaping block is illustrated. In this figure, block 119 is integral with base block 120. Base block 120 is adapted to be bolted to guide block 121, the latter having transverse slot 122 therein. Shaping block 119 and base block 120 are designed to accommodate tubular heating element 124 having wires 125 extending from the bottom and emerging into slot 122 and passing through portion 126 of guide block 121.

Referring to Fig. 13, a still further modification is shown wherein shaping block 128 and base block 129 have heater 130 disposed therein, the heater being provided with prongs 131 extending downwardly from the bottom of base block 129. Support block 133 is provided with a plurality of recesses 134 for accommodating prongs 131 of the heating element. Within block 133 suitable contacts and wiring are disposed so that prongs 131 can be plugged into one of a number of positions. Bolt holes 135 in block 133 are provided so that the shaping block may be bolted into a plugged position.

Fig. 14 shows a construction generally similar to Fig. 10 but having massive portion 105c adapted to rest against the rounded shaping block. The shaping block may be movable on a pivot or not as desired. Massive portion 105c remains in contact with the shaping block and will absorb a substantial amount of heat. The intimate thermal connection between massive portion 105c and the blade will result in a more even temperature.

In general, if the shaping block has its own heating means, then mechanical considerations only need govern the attachment of the shaping block to its base block. However where the heating means is located in the base block then in addition to mechanical considerations, the connection between the base block and shaping block must provide good heat conduction. This is obtained by having accurately finished opposed surfaces on the base and shaping blocks.

It is desirable to provide a construction whereby the front shaping block (the block cooperating with the front ends of the neckband) may be moved or held stationary as desired. Thus as has been previously pointed out, it is frequently desirable to shape or mold a collar and neckband so that the altitude of the generally triangular shape (the distance from the front of the neck to the center of the back of the neck) is maintained constant while the base of the triangle along the back of the neck is varied. Figs. 15 to 22 illustrate a construction wherein the front shaping block may be moved with the side blocks or not, as desired. The collar shaping machine is generally similar to the one previously described. Front block 34 is rigidly secured to guide or base block 140. Base block 140 may have an electric heater inside the same, portion 141 extending downwardly for supporting and guiding the leads. The shaping block may contain the heating means if desired. Base block 140 has projecting slider portions 142 and 143 resting upon slide 61' having elongated slotted portion 145. Slide 61' operates between fixed base 28 of the machine and bottom plate 146 maintained by bolts 147 in spaced relation below base 28. To maintain the spacing, bosses 148 between base plate 128 and plate 146 are provided. Base plate 140 and slider 61' are independently movable in the absence of some driving connection between the two. The side of base block 140 carries pivot bolt 149 upon which is secured latch 150 having engaging portions 151 and 152 depending downwardly from the latch at both ends. Slider 61' is provided with slot 153 for cooperation with portion 151 of the latch. As illustrated in Fig. 17, portion 151 of the latch may be positioned so that the tip is in slot 153. This provides a driving connection between slider 61' and base block 140. In the position illustrated in Fig. 17, front shaping block 34 will be moved to and from the line of movement of blocks 32 and 33.

In the position of the latch illustrated in Fig. 20, latch portion 152 is depressed so that the tip engages a recess in base 28 with latch portion 151 being clear of slider 61'. Shaping block 34 will remain in whatever position it is set. By having the latch in the disengaging position as illustrated in Fig. 20, the front shaping block will not move during operation of the machine even though slider 61' is moved.

Definite index means for maintaining the latch in either the position as illustrated in Fig. 17 or the position illustrated in Fig. 20 is provided. Thus the latch may be snapped from the disengaged position illustrated in Fig. 20 so that it is in an intermediate position as illustrated in Fig. 21. When the slider reaches a position as illustrated in Fig. 17, the latch will snap down into position.

Figure 24:
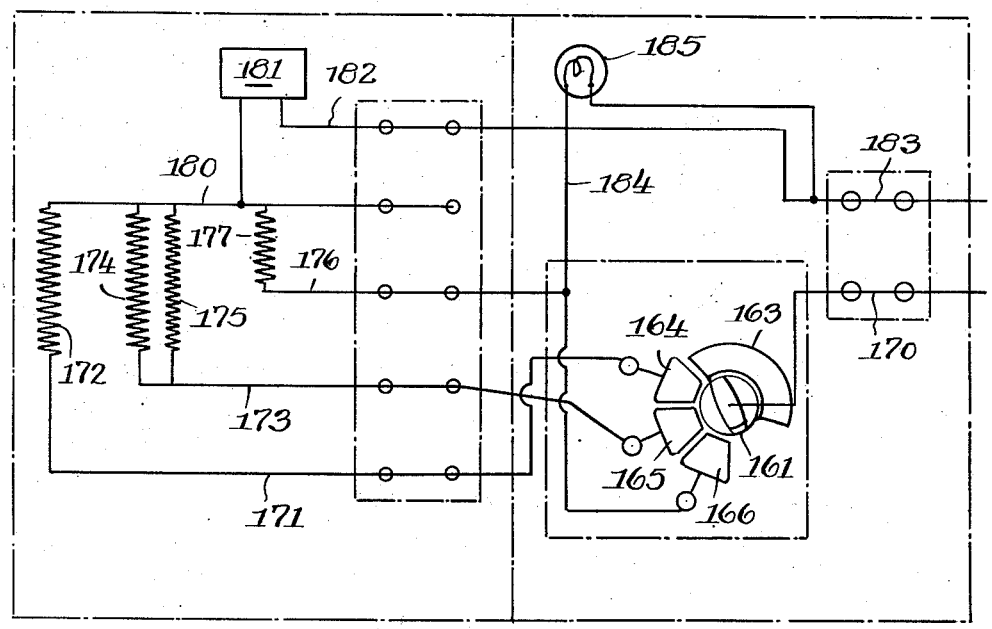
Fig. 24 is a schematic diagram of the electric heater connections.
Figure 23:
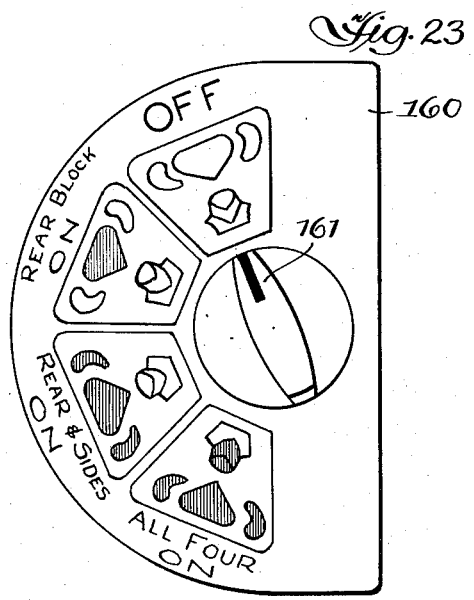
Fig. 23 is an enlarged detail of the control panel of the new machine.

As has been previously indicated, the various shaping blocks may be provided with individual heating means, or their base blocks may be provided with heating means. Fig. 23 illustrates the panel control for electric heating elements while Fig. 24 shows a circuit diagram illustrating how the various electric heating elements are controlled. Thus referring specifically to Fig. 23, panel 160 may be disposed in any desired portion of cover 25, such as for example at a corner as illustrated in Fig. 1. Panel 160 has rotatable knob 161 suitably secured to a switch shaft. Knob 161 may have four positions and panel 160 carries suitable indicia for indicating the four switch positions. As illustrated in Fig. 23, panel 160 has the markings "Off," "Rear block on," "Rear sides on," "All four on." In addition, each switch position on panel 160 carries an illustration of the various blocks making up the collar shaping assembly. The particular blocks which are energized at particular switch positions are shown lined, thus affording an operator a quickly understood indication of what is occurring at each switch position.

Referring now to Fig. 24, knob 161 is coupled to movable switch contact 163 adapted to cooperate with live switch contacts 164, 165 and 166. Movable contact 163 has an angular extent substantially equal to the angular extent of contacts 164 to 166, inclusive, so that as movable contact 163 is turned anti-clockwise as seen in Fig. 24, successive engagement of the movable contact with the stationary contacts will occur. It will be observed that movable contact 163 may simultaneously engage all contacts 164, 165 and 166 in the full operating position of the switch.

Movable contact 163 is connected to one side of power line 170. Fixed contact 164 is connected by wire 171 to one terminal of heater 172. Fixed contact 165 is connected by wire 173 to one terminal of each of heaters 174 and 175. Fixed contact 166 is connected by wire 176 to one terminal of heater 177. Heaters 172, 174, 175 and 177 have their remaining terminals connected to wire 180. Wire 180 is connected to one terminal of thermostat 181, the other terminal of which is connected by wire 182 to line wire 183. The various wires 171, 173, 176, 180 and 182 may conveniently be connected through terminal blocks shown in dotted outline. Wire 176 also has branch wire 184 connected thereto, wire 184 going to one terminal of signal light 185. The other terminal of light 185 is connected to line wire 183.

Heaters 172, 174 and 175 are associated with rear shaping block 94, side shaping blocks 32 and 33, and front shaping block 34 respectively. If desired, each block may be provided with an individual thermostat connected in series with the corresponding heater. It is understood that the heaters may be in the shaping blocks or in the base blocks.

By virtue of the heater control system disclosed herein, new methods of shaping shirt collars become possible. Thus referring to Fig. 23, with the control knob 161 set in the position indicated, all heating blocks, both stationary and movable, are de-energized and are therefore cold. If control knob 161 is turned counter-clockwise to the first position, the stationary heating block for the rear of the collar will be heated. The collar itself will be stretched by virtue of the side blocks and front block cooperating with the rear blocks. For certain types of shirts, only the rear part of the collar need be ironed. Such ironing may be desirable for sport shirts of certain types where no neckband is provided.

Rotation of control knob 161 to the next counter-clockwise position (this being the second from the off position) will result in the rear ironing block and the side ironing blocks being heated. The stretch of the collar combined with the cold front ironing block will result in the front of the collar having a rounded casual appearance which is desired for certain types of sport shirts. The first active position with the side blocks cold and the rear block hot extends the rounded casual appearance from the front of the collar toward the sides.

The third active position of control knob 161 provides for all heating blocks energized and is used for dress shirts and other shirts having neckbands and generally require ironing of substantially all of the collar. Due to the stretching of the collar, together with heating at distributed areas along the length of the collar band, substantially the same effect as ironing over the entire length of the collar band is obtained.

Figure 25:
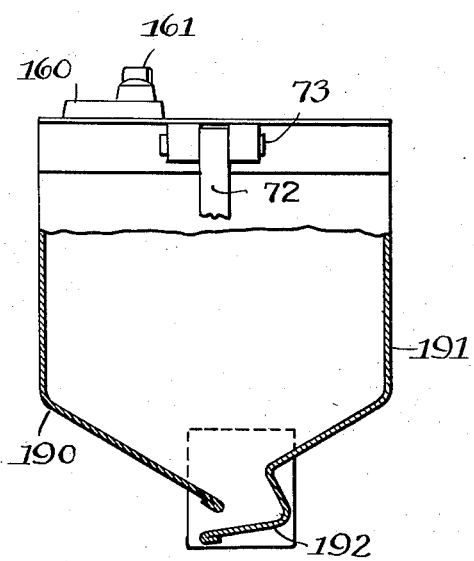
Fig. 25 shows a section of the bottom housing for the collar shaping mechanism.

The collar shaping mechanism and cover are carried on a suitable support. The entire mechanism may be considered as an insert to be disposed on a suitable table as desired. The bottom of the mechanism may be enclosed by sheet metal housing members 190 and 191 (Fig. 25). These housing members are attached to the base of the mechanism proper in any desired fashion and extend longitudinally of the machine. Thus referring to Fig. 1, foldable pattern plate 31 is at the rear of the machine with the operator generally standing in front of cover 25 facing plate 31 when it is in the position illustrated in Fig. 1. Housing members 190 and 191 have their bottom portions bent inwardly toward each other as illustrated in Fig. 25. However, the free edges of members 190 and 191 are preferably spaced from each other, edge portion 192 of member 191 being bent as illustrated in Fig. 25 to provide a vertical offset portion below the free edge of member 190. A passage chute is thus formed at the bottom of the housing and permits pins, buttons and other objects which may fall into the machine to fall through the housing.

While the collar shaping machine so far described is highly satisfactory, it is desirable with certain types of garment collars to provde ironing on the outside of the rear of the collar. Additionally, it may be desirable to temper the fabric for ironing by the application of a spray of steam or hot water to the fabric for dampening the same so that a smooth ironed surface will result. These objectives may be obtained by adding certain features of construction to the collar shaping machine previously described. These added certain features will now be disclosed in connection with Figs. 26 to 34, inclusive, of the drawings.

The general mechanical structure of the modifications to be described are generally similar to the machine which has already been described. Referring first to Figs. 26 to 29, inclusive, base 200 has cover 201. The mechanism is generally similar to the mechanism previously described and includes slide 203, coupled to operating rod 204. Slide 203 carries pin 205 for operating bell cranks 206 and 207. Bell cranks 206 and 207 operate side shaping blocks 209 and 210. Shaping blocks 209 and 210 are provided with blades 214 and 215 respectively for operating upon the inside of the rear part of a collar. So far the construction described is similar to the construction previously described.

Pivotally secured on plate 217 is ironing block 218 for operating upon the outside of the rear part of a collar. Block 218 is elongated and may have suitable heating means as an electric heating element therein. Block 218 is secured to arms 219 and 220 extending upwardly and pivotally carried on plate 217. Block 218 is movable toward and away from the collar. Block 218 is normally biased toward the collar by coil spring 222 extending between the base of the machine and cross strip 223 attached to arms 219 and 220.

Ironing block 218 may be moved against its spring bias by pins 224 and 225 carried by bell cranks 206 and 207. While two pins are illustrated, only one is necessary. Pins 224 and 225 extend through arcuate slots in the base plate. Ironing block 218 may be locked in a retracted position against the bias of spring 222 by latch 227 cooperating with cross strip 223. Latch 227 is pivotally secured in bracket 228 carried by the base plate, the latch being spring biased so that it will remain in locking position with respect to cross strip 223. As illustrated in Fig. 30, latch 227 is biased upwardly for engaging cross strip 223. Latch 227 carries unlocking pin 229 extending upwardly through cover 201.

Pattern plate 230 pivotally secured to a bracket is adapted to depress pin 229 when plate 230 is moved down over the work. The downward movement of pin 229 will unlock ironing block 218 and permit the block to respond to its spring bias and engage the outer surface of the garment collar.

A generally triangular shaped canopy plate 232 is supported on post 233 extending upwardly from base 200. Post 233 has suitable heating means as an electric heating element therein which will maintain canopy 232 at a suitable elevated temperature. The heating elements for post 233 and shaping block 218 may be connected together. Thus in the switch control illustrated in Figs. 23 and 34, heater 172 will correspond to the heaters for post 233 and block 218.

Side ironing shaping blocks 209 and 210 may be of any suitable type. In Fig. 32 there is shown a construction permitting the shaping block to discharge some steam or hot water. Thus, the block illustrated in this figure has body 234 and base 235. Base 235 may be routed to provide chamber or pocket 236. Body 234 has channel 237 extending upwardly within the body, this channel being connected to the outside by means of a number of fine openings 238 extending through the wall of the block. The size of these openings, the number and the amount of the surface of the block covered may be varied to suit requirements. Bottom chamber 236 may be sealed by plate 239 permanently attached to the base. Steam or water may be supplied to the pocket in the block by connecting a hose to channel 40.

The cross sectional area of channel 236 and passage 237 will depend upon whether steam or hot water is to be supplied. It is understood that chamber 236 and passage 237 will take a small portion of the volume of the block. Even if cold water is supplied at channel 240, the amount of water supplied will be so small that this will be converted to steam and the steam discharged through the openings in the shaping block. It is understood that the apertured part of the block will cooperate with the garment collar.

The shaping block may have its own heating means, as gas, hot water, steam or electric heater or the base block upon which the shaping block is carried may have its own heating means.

In order to utilize a jacketted type of side shaping block such as illustrated in Fig. 32, means may be provided for flashing a supply of water or steam to each of the two side shaping blocks. Referring to Fig. 31, there is shown in diagrammatic form a control system for effecting this. Slide 203 for operating the side shaping blocks is coupled to piston 242 of air cylinder 243. Air cylinder 243 has air pipe 244 connected through throttle valve 245 connected to manually controlled two-way valve 246 having compressed air inlet 247 and control handle 248. Valve 246 has chambers 246a and 246b, these being so arranged with reference to air inlet 247, throttle valve connection 245a and air exhaust 246c that in one valve position, compressed air is fed to the cylinder. In the other valve position, air from the cylinder must pass through throttle valve 245 to exhaust. In this latter valve position, springs 66 or 204 will be strong enough to move the blocks to their expanded position. However the air throttling action due to valve 245 will prevent any sudden movement of the blocks when released. In the neutral position of the valve the air in cylinder 242 will maintain the blocks in any desired position. Valve 246 and the air cylinder and air throttle means 245 may be applied to any collar shaping machine. Manual control 248 may be moved either to the left or to the right to cause slide 203 to move in a desired direction.

Manual control 248 is coupled to dog 250 having tip 251. Dog 250 cooperates with bell crank 252 pivoted at 253. Bell crank 252 has arms 254 and 255 respectively. Tip 251 of the dog engages the tip of bell crank arm 254 and is adapted to slip past arm 254 when dog 250 is turned counter-clockwise through a predetermined angle.

Arm 255 engages finger 256 of arm 257 of handle 258. Handle 258 is biased to the right by spring 259 while arm 255 of the bell crank is biased to the left by spring 260. Handle 258 controls valve 262 having inlet pipe 263 and outlet pipe 264. Outlet pipe 264 is connected to side shaping blocks 209 and 210.

It is clear that valve 262 may be opened by handle 258 being moved to the left. When handle 258 is moved to the left, dog 250 will be moved upwardly as seen in Fig. 31 and will snap or flash handle 258 to open valve 262 for a short time. After tip 251 has slipped past bell crank arm 254, return movement of dog 250 will be permitted because of spring 260 yielding. The timing of the opening of the valve 262 with respect to valve 246 and the duration of the opening of valve 262 may be adjusted by controlling the effective length of tip 251 and arm 254.

The side shaping blocks 209 and 210 may also embody the features of construction illustrated in Figs. 33 and 34 respectively. Thus referring to Fig. 33 shaping block 210a may have some serrations 268. These serrations are parallel to the neckline of the shirt and are disposed upon that part of the block which contacts a portion of the shirt neckband. Serrations 263 will thus cooperate with the fabric of the neckband of the shirt and prevent the shirt from slipping upwardly when the blocks are open to stretch the shirt.

In Fig. 34 a modification is illustrated wherein side block 209a has portion 269 metallized to provide a rough surface. The metallization may be obtained by coating with metal particles or other particles such as by spraying or the like. In this modification the roughened surface due to metallizing will be rough in all directions. In distinction to that, the modification illustrated in Fig. 33 will permit the collar to adjust itself while preventing the collar from slipping upwardly.

It is understood that the modifications illustrated in Figs. 33 and 34 may have the jacket construction illustrated in Fig. 32. It is also understood that both of the shaping blocks 209 and 210 will be similar.

The blocks illustrated in Figs. 33 and 34 may have individual heating means, as electric heaters, or the base blocks carrying the same, may have heating means or both the base blocks and shaping blocks may have heating means. The shaping block illustrated in Fig. 33 has steam discharge apertures similar to Fig. 32.

Referring back to Figs. 26 to 29, inclusive, the machine will have front shaping block 272. This shaping block may be movable or not as desired and may be conveniently secured in substantially the same manner as the front shaping block in the machine previously described, in connection with Figs. 1 to 25, inclusive.

Figure 26:
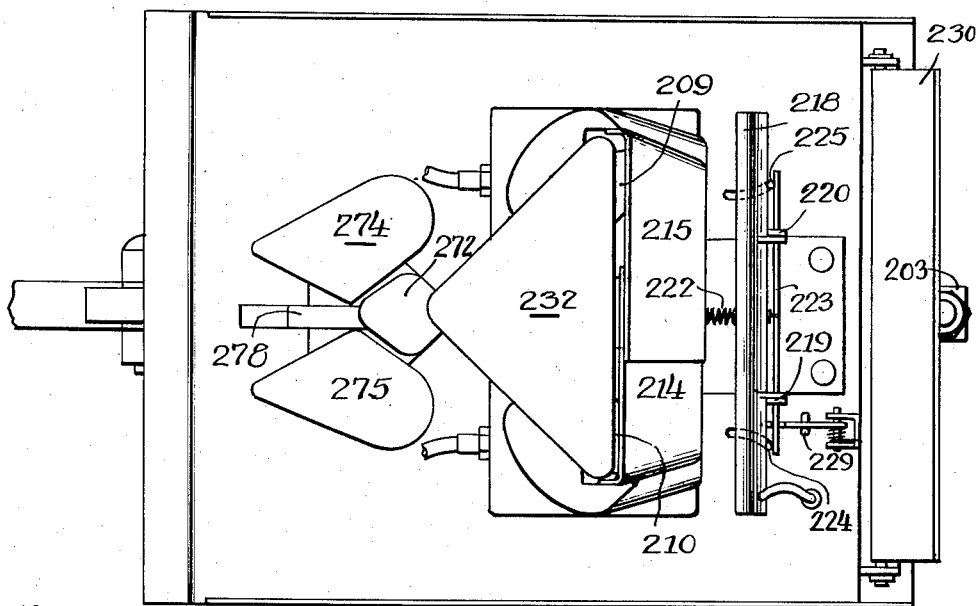
Fig. 26 is a view along line 26—26 of Fig. 27 disclosing a modified form of the invention.
Figure 27:
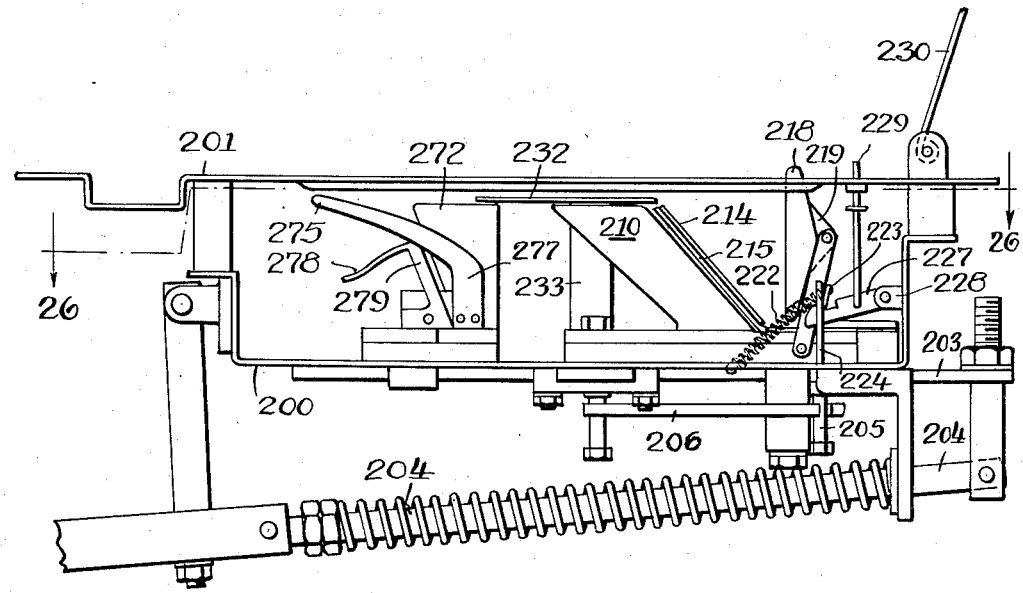
Fig. 27 is an elevation of the modification illustrated in Fig. 26.
Figure 28:
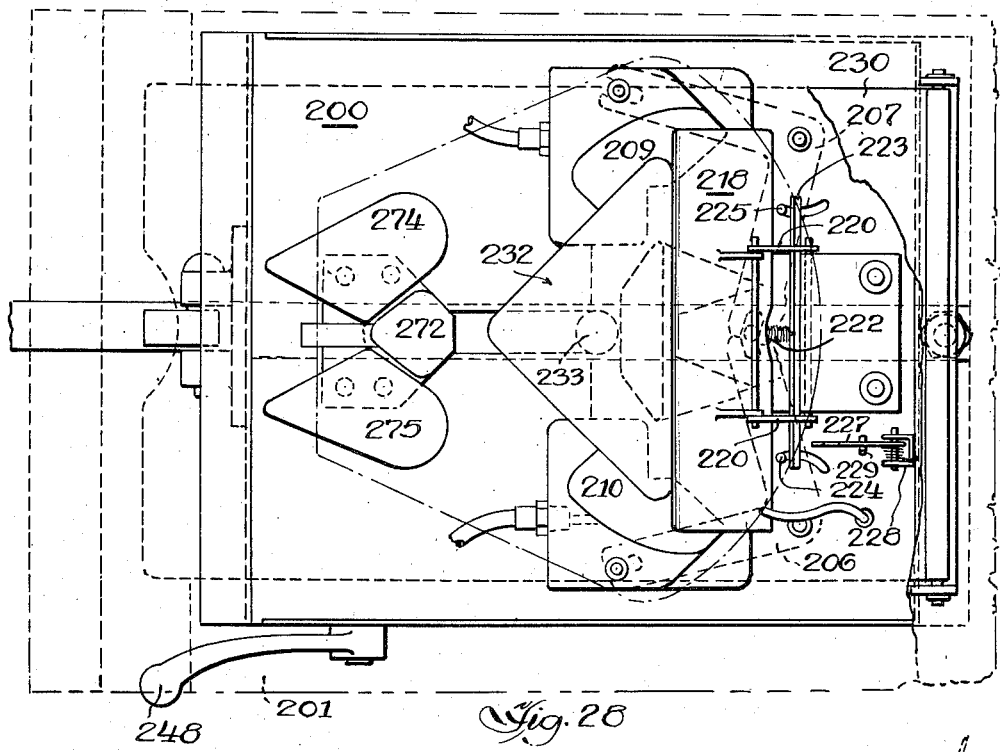
Fig. 28 is a plan view of the modification illustrated in Fig. 26, the parts, however, being in a different position.
Figure 29:
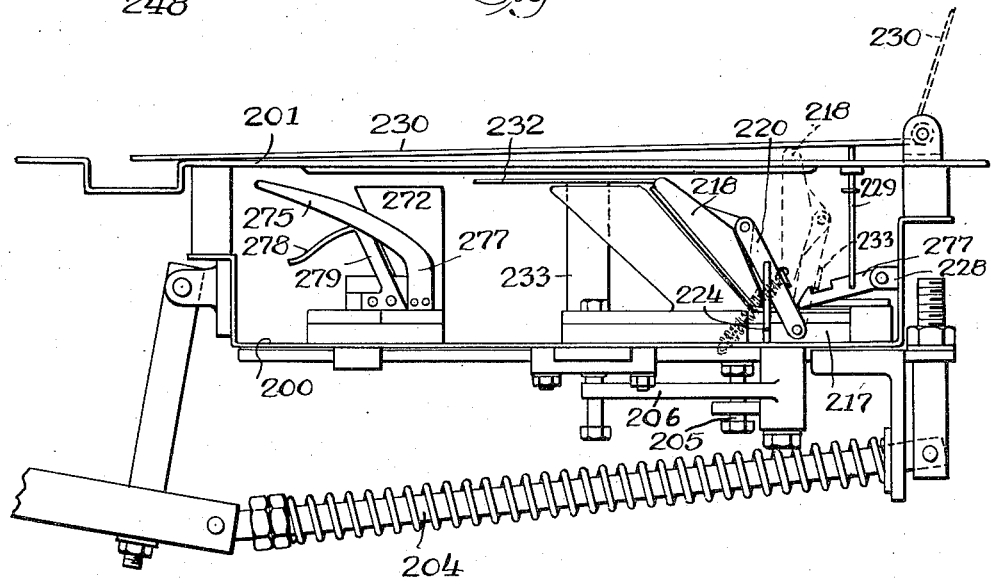
Fig. 29 is an elevation of the modification with the parts in the position illustrated in Fig. 28.

In addition to the front shaping block, collar tip supporting portions 274 and 275 are provided on each side of the front shaping block. These are wing shaped plates as illustrated in Fig. 26 and have portions 277 extending down to the bottom of the block for attachment thereto. These wing plates may be attached by bolting or in any other suitable fashion, and may have means for adjusting the elevation and shape. Thus, for example, the mounting holes may be elongated to permit these plates to be adjusted to any desired position and thereafter tightly bolted.

Support strip 278 is provided for the buttonhole strip of the shirt. Strip 278 has supporting portion 279 which may be bolted to the base of the front block.

Rear shaping block 218 for the exterior of the rear portion of the collar need not necessarily be used in conjunction with blades associated with the lateral blocks. For example, referring to Fig. 9, three blades are shown for ironing the inside of the rear collar portion. While shaping block 218 is preferably used with such a blade structure, it is understood that only two overlapping blades may be used, or only one stationary blade, as 103 in Fig. 9, may be used or no blades at all need be provided. However it is preferred to have pressing members on both sides of the collar at the rear if an outside shaping block 218 is used.

It is understood that the electric switching sequence illustrated in Figs. 23 and 24 may be applied to the modifications illustrated in Figs. 26 to 29, inclusive.

I claim:

1. A collar shaping machine for accommodating and shaping the collars of a wide variety of garment styles and sizes, comprising a base, a pair of guide blocks movably supported on said base, means for simultaneously moving said guide blocks toward and away from each other, a third guide block carried by said base and symmetrically disposed with respect to said first two guide blocks, heat conductible, readily detachable shaping blocks having an outer contoured surface conforming to the style of the collar to be shaped for shaping the same, there being as many shaping blocks as there are guide blocks, means detachably securing said shaping blocks on said guide blocks, means on said base for moving said third guide block along a line generally perpendicular to the line of movement of said pair of guide blocks, and means supplying heat to said shaping blocks.

2. In a collar shaping machine, the combination of a shaping block having an outer surface contoured to obtain a desired collar shape, heating means for said block, a base for supporting said shaping block and adjustable means securing said block on said base in any one of a number of different positions.

3. In a collar shaping machine, the combination of a shaping block having an outer surface contoured to obtain a desired collar shape, heating means disposed within said block, a base for supporting said shaping block, adjustable means for securing said block on said base in any one of a number of different positions, said adjustable means including plug and socket means on said shaping and base blocks.

4. A collar shaping machine comprising a base, a fixed plate upon which the work is adapted to rest for pressing, a pair of guide blocks movably supported on said base, means for simultaneously moving said guide blocks toward and away from each other, said means including an actuating member movable along a line generally perpendicular to the line of travel of said first named two guide blocks, a third guide block carried by said base and symmetrically disposed with respect to said first two guide blocks, shaping blocks for shaping a collar, detachable means for supporting said shaping blocks on said guide blocks, and manual means for establishing a driving connection between said actuating member and said third guide block, in one position of said manual means said three guide blocks being movable and in another position of said manual means said first named two guide blocks only being movable with the third guide block being stationary.

5. A collar shaping machine comprising a base, a fixed plate upon which the work is adapted to rest for pressing, a pair of guide blocks movably supported on said base, means for simultaneously moving said guide blocks toward and away from each other, a third and fourth guide block carried by said base and symmetrically disposed with respect to said first two guide blocks, said third guide block being disposed in front of the line of travel of the first named two guide blocks so that said third guide block engages the front portion of the collar, said fourth guide block being disposed rearwardly of the line of travel of the first named two guide blocks, shaping blocks detachably attached to said first named three guide blocks, press plates carried by said first named two guide blocks and extending toward each other, a press plate carried by said fourth guide block and extending toward said first named two press plates, means for maintaining the press plates carried by said guide blocks in aligned position as said first named guide blocks move toward and away from each other, said press plate carried by said fourth guide block contacting the remaining two press plates, electric heating means for heating the three shaping blocks and the fourth guide block whereby the press plates are maintained hot and cooperate with the shaping blocks for pressing the collar.

6. The pressing machine according to claim 5 wherein means are provided for moving said third guide block along a line generally perpendicular to the line of travel of the first named two guide blocks and wherein manual means are provided for disengaging said third named guide block from said means for moving the same.

7. A collar shaping machine comprising a base, a fixed plate upon which the work is adapted to rest for pressing, a pair of guide blocks movably supported on said base, means for simultaneously moving said guide blocks toward and away from each other, a third guide block carried by said base and symmetrically disposed with repect to said first two guide blocks, shaping blocks for shaping a collar, detachable means for supporting said shaping blocks on said guide blocks, a latch carried by said third guide block, a driving member for actuating said first named two guide blocks, said latch cooperating with said driving member for establishing a driving connection between said third guide block and driving member, said latch being movable to disengage said driving member from said third guide block to permit said third block to remain stationary.

8. A collar shaping machine comprising a base, a fixed plate upon which the work is adapted to rest for pressing, a pair of guide blocks movably supported on said base, means for simultaneously moving said guide blocks toward and away from each other, a third guide block carried by said base and symmetrically disposed with respect to said first two guide blocks, shaping blocks for shaping a collar, means for supporting said shaping blocks on said guide blocks, a fourth shaping block opposite said third block, said third and fourth blocks lying on opposite sides of the line of travel of the first two blocks, and means for moving said fourth block toward and from the line of travel of said first two blocks, said third block engaging the front of the collar, the fourth block engaging the outside of the rear of the collar and the first two blocks engaging the inside of the collar.

9. The machine according to claim 8 wherein a stationary block is provided for supporting said plate and means for heating said stationary block to maintain said plate hot.

10. A collar shaping machine comprising a base, a fixed plate upon which the work is adapted to rest for pressing, a pair of guide blocks movably supported on said base, means for simultaneously moving said guide blocks toward and away from each other, said blocks being movable toward each other for accommodating the placing of a garment on said machine and said blocks being movable away from each other for tensioning the neck portion of said garment, a third guide block carried by said base and symmetrically disposed with respect to said first two guide blocks, shaping blocks for pressing and shaping a collar, means for supporting said shaping blocks on said guide blocks, a fourth shaping block carried by said base and disposed opposite said third shaping block, said third and fourth shaping blocks lying on opposite sides of the line of travel of the first named two shaping blocks, means for moving the said fourth shaping block away from the line of travel of said first named two blocks when said first named two shaping blocks are approaching each other, means for moving said fourth shaping block toward the line of travel of said first named two blocks when said first named two blocks are ironing, said third block engaging the front of the collar while the fourth shaping block engages the outside of the rear of the collar and the first named two blocks engage the inside of the collar.

11. The machine according to claim 10 wherein means are provided for locking the fourth shaping block in position away from the line of travel of said first named two blocks, a pattern plate hingedly secured on said machine and means operated by the movement of said pattern plate for releasing the lock on said fourth shaping block and means urging said fourth shaping block into ironing position against the exterior of the rear of said collar.

12. The machine according to claim 10 wherein means are provided for biasing said fourth shaping block in ironing position where said block is closest to the line of travel of said first named two blocks and means for moving said fourth shaping block against its bias away from the line of travel of said first named two blocks when said first named two blocks are moved toward each other, locking means for maintaining said fourth shaping block in a retracted position against its bias, a pattern plate hingedly secured on said machine and means operated by the movement of said pattern plate for releasing said locking means for said fourth shaping block so that said fourth shaping block may respond to its bias and move into ironing position.

13. A collar shaping machine comprising a base, a fixed plate upon which the work is adapted to rest for pressing, a pair of guide blocks movably supported on said base, means for simultaneously moving said guide blocks toward and away from each other, a shaping block for each guide block, each shaping block having a thin pressing plate, said pressing plates extending toward each other, means for moving each shaping block and its pressing plate, said pressing plates remaining in alignment throughout the travel of the shaping blocks, a third guide block carried by said base and symmetrically disposed with respect to said first two guide blocks, a shaping block for said third guide block, a fourth shaping block, said third and fourth shaping blocks being on opposite sides of the line of travel of said first named two blocks, said fourth block being movable to and from the pressing plates, means for moving said fourth shaping block away from the pressing plates when said first named two blocks are moved toward each other, and means for moving said fourth shaping block toward the pressing plates when said first named two blocks are in ironing position.

14. The machine according to claim 13 wherein a pattern plate is hingedly secured on said machine, means for locking said fourth shaping block in retracted position and means operated by the movement of said pattern plate for releasing the lock on said fourth shaping block.

15. A collar shaping machine comprising a base, a fixed plate upon which the work is adapted to rest for pressing, a pair of guide blocks movably supported on said base, means for simultaneously moving said guide blocks toward and away from each other, said blocks being movable toward each other for accommodating the placing of a garment on said machine and said blocks being movable away from each other for tensioning the neck portion of said garment, a third guide block carried by said base and symmetrically disposed with respect to said first two guide blocks, shaping blocks for pressing and shaping a collar, means for supporting said shaping blocks on said guide blocks, a fourth shaping block carried by said base and disposed opposite said third shaping block, said third and fourth shaping blocks lying on opposite sides of the line of travel of the first named two shaping blocks, means for pivotally supporting said fourth shaping block to lock on an axis parallel to the line of travel of said first named two blocks, means for moving said fourth block away from the line of travel of said first named two blocks when said first named two blocks are moved toward each other, means permitting said fourth shaping block to move toward the line of travel of said first named two blocks when said first named two blocks are ironing the work, said third block engaging the front portion of the collar while the fourth shaping block engages the outside of the rear of the collar and the first named two blocks engage the inside of the collar.

16. The machine according to claim 15 wherein means are provided for biasing said fourth shaping block in ironing position where said shaping block is closest to the line of travel of said first named two blocks, said fourth shaping block being moved against its bias away from the line of travel of said first named two blocks when said first named two blocks are moved toward each other, locking means for maintaining said fourth shaping block in a retracted position against its bias, said means permitting said fourth block to move including a pattern plate hingedly secured on said machine and means operated by the movement of said pattern plate for releasing said locking means for said fourth shaping block so that said fourth shaping block may respond to its bias and move into ironing position.

17. A collar shaping machine comprising a base, a fixed plate upon which the work is adapted to rest for pressing, a pair of guide blocks movably supported on said base, means including a pair of bell cranks for simultaneously moving said guide blocks toward and away from each other, said blocks being movable toward each other for accommodating the placing of a garment on said machine and said blocks being movable away from each other for tensioning the collar portion of said garment, a third guide block carried by said base and symmetrically disposed with respect to said first two guide blocks, shaping blocks for pressing and shaping a collar, means for supporting said shaping blocks on said guide blocks, a fourth shaping block carried by said base and disposed opposite said third shaping block, said third and fourth shaping blocks lying on opposite sides of the line of travel of the first named two shaping blocks, means carried by said bell cranks and cooperating with said fourth block for moving the said fourth shaping block away from the line of travel of said first named two blocks when said first named two shaping blocks are approaching each other, latch means for retaining said fourth block in a retracted position, means for releasing said latch means so said fourth shaping block may move toward the line of travel of said first named two blocks when said first named two blocks are ironing, said third block engaging the front of the collar while the fourth shaping block engages the outside of the rear of the collar and the first named two blocks engage the inside of the collar.

18. The machine according to claim 17 wherein a pattern plate is hingedly secured on said machine and means operated by the movement of said pattern plate for releasing the latch on said fourth shaping block and means urging said fourth shaping block into ironing position against the exterior of the rear of the collar.

19. A collar shaping machine comprising a base, a pair of guide blocks suported on said base to be movable toward and away from each other, a pair of bell cranks connected to said guide blocks for operating the same, a third guide block carried by said base and symmetrically disposed with respect to said first named two guide blocks, shaping blocks for shaping a collar, means for securing said shaping blocks to said guide blocks, a fourth shaping block for operating on the exterior of the rear of a collar, said fourth shaping block extending along a line generally parallel to the line of movement of said first named two blocks, means for pivotally securing said fourth shaping block on a pivot axis generally parallel to the length of said fourth shaping block, spring means for biasing said fourth shaping block toward the line of travel of said first named two blocks, a pin carried by at least one bell crank, said pin being adapted to move said fourth shaping block against its bias to a retracted position when said first named two shaping blocks are moved toward each other, latch means for locking said fourth shaping block in retracted position, a pattern plate hingedly secured to said table and adapted to be moved down against the table to provide a patern for folding a garment, means actuated by said pattern plate when said pattern plate is moved down against the garment to release the locking means for said fourth shaping block whereby said fourth shaping block will respond to its bias and provide a pressing action against the exterior of the collar.

20. The construction according to claim 19 wherein a fixed plate is provided upon which the work is adapted to rest for pressing and a post having means for heating the same is provided for supporting said fixed plate upon said base.

21. The construction according to claim 20 wherein said third shaping block carries wing plates for supporting the tips of a collar.

22. The construction according to claim 19 wherein said first named two blocks are provided with metal blades extending toward each other and adapted to operate on the inside of the rear portion of a collar, said metal blades and fourth shaping block being opposed to each other to provide ironing of the collar portion therebetween.

23. In a collar shaping machine having two heated shaping blocks movable toward and away from each other and adapted to engage inside portions of a collar and having a third shaping block for engaging the inside of the front of the collar, at least said first named two shaping blocks having pockets therein connected to atmosphere through fine passages, means for controlling the movement of said first named two blocks toward and away from each other, said means including a control handle, means for supplying water in a suitable form to said pockets in said shaping blocks and means for opening said supply to said shaping blocks for a short period of time when said first named two shaping blocks are caused to separate from each other and for closing the supply at other times whereby when said collar is being stretched and being ironed by said shaping blocks, the collar material is tempered by a quick blast of steam issuing from said shaping blocks.

24. The construction according to claim 23 wherein said means for controlling the supply to said shaping blocks includes a valve, said valve being normally closed, means for engaging said valve to open the same and means for momentarily operating said last named means so that said valve is flashed open for a brief period.

25. In a collar shaping machine for operating on garments, a shaping block adapted to be heated and adapted to engage the collar portion of said garment, said block comprising a roughened portion for engaging the collar fabric.

26. In a collar shaping machine for operating on garments, a shaping block adapted to be heated and adapted to engage the collar portion of a garment, said block comprising a fabric engaging portion having serrations extending along lines parallel to the neck line of the collar, said serrations being designed so that the neck portion of said garment will be restrained against slipping off said block.

27. In a collar shaping machine for operating on garments, a heated shaping block for engaging the collar portion and ironing the same, said block having a pocket therein and having a plurality of apertures connecting said pocket to atmosphere, said apertures being located at that portion of the block which is normally contacted by the garment, said block having an external connection to said pocket for supplying water in a suitable form so that steam may be expelled from said pocket onto the fabric.

28. In a collar shaping machine for garments, a heated shaping block for tensioning and ironing the collar, said block having an internal pocket connected to atmoshpere by a plurality of fine apertures at the portion of the block contacted by the garment material, said pocket having a passage for supplying water in a suitable form to said pocket, said block having the portion provided with apertures roughened so that the collar portion will be prevented from slipping off said block.

29. The construction according to claim 28 wherein said block has serrations along lines parallel to the neck line of the collar.

30. In a method of pressing and shaping a garment collar with a machine having two lateral shaping blocks movable toward and away from each other and having a third shaping block for the front of the collar, the method of operating said machine which comprises heating said two lateral ironing blocks while keeping said third ironing block cool whereby a rolled collar front effect is provided.

31. In a method of pressing and shaping a garment collar with a machine having two lateral shaping blocks movable toward and away from each other and having a third shaping block for the front of the collar and having a fourth shaping block for operating on the rear portion of the collar, the method of operating said machine which comprises heating said two lateral ironing blocks and the fourth ironing block while keeping the third ironing block cool whereby a rolled collar front effect is provided.

32. A collar shaping machine including a pair of shaping blocks movable toward and away from each other for operating on the side portions of the collar and a third shaping block for operating on the front portion of the collar and a fourth shaping block for operating on the rear portion of the collar, individual electric heating means for thermally energizing said shaping blocks and switching means for energizing in successive steps only the fourth shaping block, the first, second and fourth shaping blocks; and all four shaping blocks, whereby different degrees of collar roll may be secured.

33. A collar shaping machine including a pair of shaping blocks movable toward and away from each other for operating on the side portions of a collar and a third shaping block for operating on the front portion of a collar, a fourth shaping block for operating on the rear portion of the collar, a work rest carried by a post, individual electric heating means for thermally energizing said shaping blocks and post, and switching means for energizing in successive steps only the fourth shaping block and post, the first, second and fourth shaping blocks and post; and all blocks and post, whereby different degrees of collar roll may be secured.

34. A collar shaping machine comprising a base, a pair of guide blocks movably supported on said base between two positions, a third guide block carried by said base and symmetrically disposed with respect to said first two guide blocks, shaping blocks carried by said guide blocks, spring means for biasing said first two guide blocks to one position, means including an air cylinder and piston for overcoming said spring bias to move said first two guide blocks toward their other position, and means for throttling air discharged by said cylinder to control the return travel of said first two blocks in response to their spring bias.

35. In a collar shaping machine having a pair of guide blocks movably supported on said base, said guide blocks being adapted to move to and from each other between two positions, a third guide block carried by said base and symmetrically disposed with respect to said first two guide blocks and movable with respect to said first guide blocks, shaping blocks carried by said three guide blocks, spring means for biasing said three guide blocks to one position, said third guide block being movable to and from the line of travel of said first named two guide blocks, means including an air cylinder and piston adapted to be operated by compressed air for overcoming the spring bias of said guide blocks to move the same toward their other position, and means for controlling the rate of discharge of air from said air cylinder when said air cylinder is disconnected from a compressed air source and said guide blocks are moving back to their one position in response to their spring bias.

36. In a collar shaping machine having a base, a pair of guide blocks movably supported on said base, said guide blocks being movable toward and from each other, a third guide block carried by said base and movable to and from the line of travel of said first named two guide blocks, shaping blocks detachably disposed on said guide blocks, spring means for biasing said guide blocks to one extreme position, means including an air cylinder and piston for overcoming said spring bias when energized by compressed air and moving said guide blocks toward their other extreme position, air throttling means, a control valve and means for operating said valve so that in one position compressed air is fed to said cylinder to move the piston in a spring bias overcoming direction and in another position said cylinder is connected to atmosphere through said throttling means whereby the throttling of air discharged from said cylinder will retard the movement of said guide blocks in response to their spring bias.

37. A collar shaping machine comprising a base, a pair of guide blocks supported on said base to be movable toward and away from each other, a third guide block carried by said base and symmetrically disposed with respect to said first two named guide blocks, shaping blocks secured to each of said guide blocks, and wing plates carried by the shaping block on said third guide block for supporting the tips of the collar.

38. A collar shaping machine comprising a base, a pair of guide blocks supported on said base to be movable toward and away from each other, a third guide block carried by said base and symmetrically disposed with respect to said first named two guide blocks, shaping blocks detachably secured to said guide blocks, a post carried by said base and disposed in a region between said first named three guide blocks, a work support plate carried by said post, means for heating said three shaping blocks and said post and wing plates carried by said third shaping block for supporting the tips of the collar.

39. A collar shaping machine comprising a base, a pair of guide blocks supported on said base to be movable toward and away from each other, a third guide block carried by said base and symmetrically disposed with respect to said first named two guide blocks, shaping blocks detachably secured to said guide blocks, a post carried by said base and disposed in a region lying between said first three guide blocks, a work support plate carried by said post, means for heating said three guide blocks and said post, and a support strip carried by said third guide block extending away from said first named two guide blocks, said support strip being adapted to support a button strip of a garment.

40. The construction according to claim 39 wherein said third shaping block carries wing plates disposed on opposite sides of the button strip for supporting the tips of a collar.

41. In a collar shaping machine comprising a base, a plurality of shaping blocks, means for moving said shaping blocks toward and away from each other, a housing for said machine, said housing including side plates having bottom portions extending toward each other, said bottom portions being shaped to provide a discharge path for pins, buttons or other articles falling from the garment during operation of the machine.

42. A collar shaping machine comprising a base, a pair of guide blocks movably supported on said base, means for simultaneously moving said guide blocks towards and away from each other, a third guide block carried by said base and symmetrically disposed with respect to said first two guide blocks, shaping blocks for shaping a collar, means for detachably supporting said shaping blocks on said guide blocks, means for moving said third guide block along a line generally perpendicular to a line of movement of said first two guide blocks, and means for disabling the last named means for moving said third block.

43. In a collar shaping machine, the combination of a shaping block having an outer surface contoured to obtain a desired collar shape, a base for supporting said shaping block, adjustable means for securing said block on said base in any one of a number of different positions, said adjustable means including plug and socket means on said shaping block and said base.

44. A collar shaping machine comprising a base, a fixed plate upon which the work is adapted to rest for pressing, a pair of guide blocks movably supported on said base, means for simultaneously moving said guide blocks toward and away from each other, said means including an actuating member movable along a line generally perpendicular to the line of travel of said first named two guide blocks, a third guide block carried by said base and symmetrically disposed with respect to said first two guide blocks, shaping blocks for shaping a collar, detachable means for supporting said shaping blocks on said guide blocks, and means for establishing a driving connection between said actuating member and said third guide block, in one position of said means said three guide blocks being movable, and in another position of said means, said means and said first named two guide blocks only being movable with the third guide block being stationary.

45. A collar shaping machine for accommodating and shaping the collar of a wide variety of garment styles and sizes, comprising a support structure, a plurality of collar shaping blocks disposed for movement toward and away from each other on said support structure, each of said shaping blocks having an outer contoured surface conforming to the style of the collar to be shaped for shaping the same, mechanism on said structure detachably connected to said blocks to move said blocks, means cooperating with said blocks and said mechanism to limit movement of said blocks each to a predetermined path, means for supplying heat to said shaping blocks, and a thermostat connected to said heating means to control the temperature of said shaping blocks.

46. A collar shaping machine comprising a base, a fixed plate upon which the work is adapted to rest for pressing, a pair of guide blocks movably supported on said base, means for simultaneously moving said guide blocks toward and away from each other, a third guide block carried by said base and symmetrically disposed with respect to said first two guide blocks, said third guide block being disposed in front of the line of travel of the first named two guide blocks so that said third guide block engages the front portion of the collar, shaping blocks detachably attached to said first named three guide blocks, press plates carried by said first named two guide blocks and extending toward each other, means for maintaining the press plates carried by said guide blocks in aligned position as said first named guide blocks move toward and away from each other, electric heating means for heating the three shaping blocks whereby the press plates are maintained hot and cooperate with the shaping blocks for pressing the collar.

References Cited in the file of this patent

UNITED STATES PATENTS

| | | |
|---|---|---|
| 2,172,857 | Steele | Sept. 12, 1939 |
| 2,192,786 | Campbell | Mar. 5, 1940 |
| 2,504,934 | Luke | Apr. 18, 1950 |
| 2,687,832 | Westwood | Aug. 31, 1954 |
| 2,732,981 | Neckel | Jan. 31, 1956 |
| 2,768,774 | Rieck | Oct. 30, 1956 |
| 2,769,585 | Goldstein | Nov. 6, 1956 |